N. LIBERATO.
ANIMAL TRAP.
APPLICATION FILED AUG. 25, 1913.
1,124,043.
Patented Jan. 5, 1915.
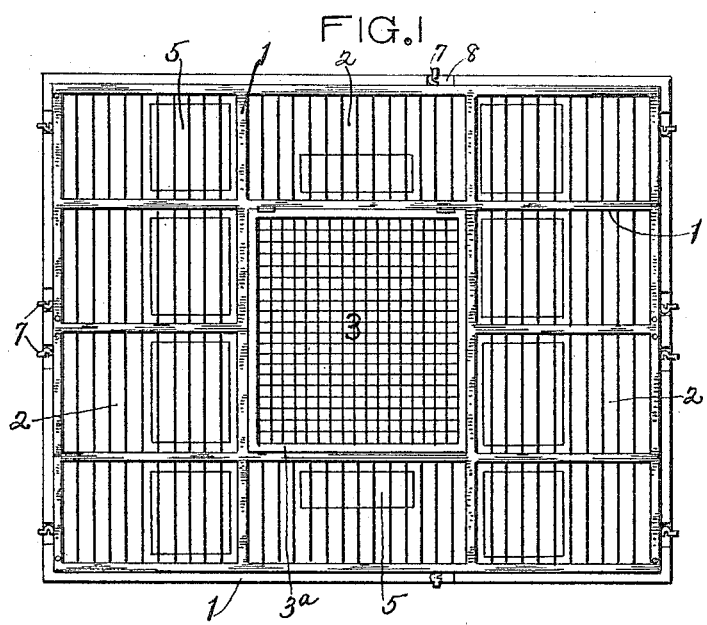
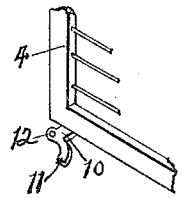
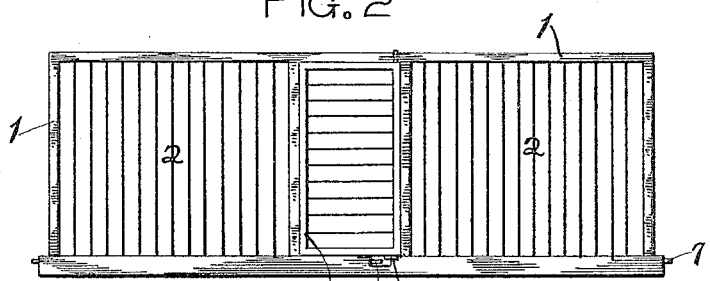
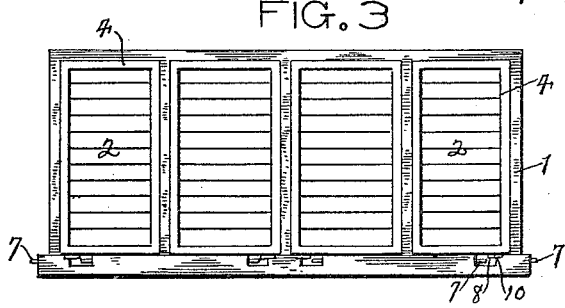
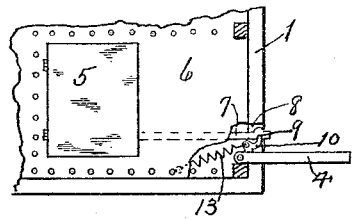
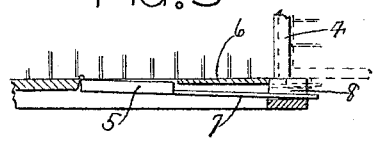
WITNESSES
INVENTOR
Nicola Liberato
By H. W. Stevenson
Attorney

United States Patent Office.

NICOLA LIBERATO, OF LUSK, PENNSYLVANIA, ASSIGNOR OF ONE-SEVENTH TO HENRY L. MEERHOFF, OF IRWIN, PENNSYLVANIA, ONE-SEVENTH TO ANTONI DI CRESCENZO, OF MANOR, PENNSYLVANIA, AND ONE-SEVENTH TO LOUIS DELLA PENNA, ONE-SEVENTH TO FILENO MASTROCOLO, ONE-SEVENTH TO JIOVACCHINO DI PRINZIO, AND ONE-SEVENTH TO AGOSTINO MARCHISIO, ALL OF RILLTON, PENNSYLVANIA.

ANIMAL-TRAP.

1,124,043.

Specification of Letters Patent.

Patented Jan. 5, 1915.

Application filed August 25, 1913. Serial No. 786,520.

*To all whom it may concern:*

Be it known that I, NICOLA LIBERATO, a subject of the King of Italy, residing at Lusk, in the county of Westmoreland and State of Pennsylvania, have invented a certain new and useful Improvement in Animal-Traps, of which the following is a specification.

My invention relates to certain new and useful improvements in animal traps with special reference to the mechanism employed for automatically closing the door which confines the animal caught, said mechanism involving means whereby the animal itself will be utilized to spring the trap.

A further object to be attained is in providing a plurality of contiguous cells, all of which abut on a centrally disposed decoy or baiting compartment, whereby a predetermined number of animals may be caught by one setting of the trap, and each be confined in a separate cell.

In the accompanying drawing, which illustrates one embodiment of my invention, Figure 1 is a plan view showing a plurality of assembled contiguous cells separated and protected by a suitable grating and involving a centrally disposed compartment or cage. Fig. 2 is a side elevation, and Fig. 3 an end elevation: Fig. 4 is a fragmental view in plan formation partly broken away showing operating mechanism set ready to be released. Fig. 5 is a fragmental side elevation in cross section showing position of the mechanism after being sprung and by dotted lines in its locked attitude, and Fig. 6 shows a fragment of the door carrying a trigger member.

Throughout the several views shown in the drawings the numeral 1 designates the supporting skeleton frame work structure divided to form a plurality of individual and separated compartments or cells 2, the walls and roof of which are here shown as being of a grating or bar formation, but this feature can be modified to suit the special requirements of the trap. The rear of all the combined cells abuts against a centrally positioned compartment 3, which is entirely separated from the said cells 2, and serves only in the capacity of a decoy or baiting feature, whereby the animals intended to be caught are obliged to enter any one of the cells 2 in order to reach the bait. This said compartment is closed by a trap door 3ª.

The opening to each cell is guarded by a hinged door 4, which preferably swings outward, leaving a full clearance for the animal to enter, and is automatically made to swing shut the instant the animal enters the cell.

The mechanism I employ and show herewith, which constitutes the fundamental feature of my invention, involves a hinged platform or depressible portion 5, positioned in and constituting part of the floor 6 of each cell unit, excepting the decoy compartment, the area of which will be determined by actual practice and usage. Secured to this said member 5, preferably on its under surface, is a rigid bar 7 that extends underneath the floor of the cell and terminates in a receptive groove or slot 8 arranged in the door sill, said bar being provided adjacent to the free end thereof with one or more notches 9. Secured to the under frame of each door, and designed to operate in the said groove 8, is a trigger 10 which lies on a horizontal plane with the said bar 7, when that member is in its raised position. This said trigger involves an engaging finger portion 11 and apertured knuckle 12. A tension spring member 13, connected at one end to the apertured knuckle and at the opposite end to a convenient point underneath the floor, completes the elements entering into the construction of my improved animal trap.

When the trap is set the door of each cell is swung open to its limit of movement and the trigger finger 11 made to engage in the notch 9 of the bar 7, as shown in Fig. 4, at which time the spring member 13 will be drawn on a tension, the said rod 7 carrying the strain and preventing the door from closing. The animal on entering the cell is obliged to pass to the rear thereof before it can reach the bait confined in the middle compartment, and in so doing it must step on the platform 5. The weight of the animal will be sufficient to depress this member, which in dropping also bears down the rod 7, and thereby breaks connection with the trigger 10, the consequent result being that the released spring tension will automatically close the door and confine the trapped animal.

What I claim as my invention is:

1. In an animal trap an inclosed cell or compartment having an admission opening, an outwardly swung door guarding said opening, a depressible trap door or platform arranged in the floor of the cell, a trip rod connected to said trap door and projecting underneath the floor to a recess formed in the door sill, said rod being provided with a notch adjacent to its outer free extremity, a trigger carried by the door which engages in said notch to hold the door in open position, and a tension spring member connected to the said trigger which automatically pulls the door shut when the contact between said trigger and bar member is broken.

2. In an animal trap, a plurality of contiguous separated and inclosed cells opening outward, their rear portions abutting on a centrally disposed decoy or baiting space; an outwardly swinging door for each cell; mechanism in each cell to be operated by the animal itself after entering the cell for automatically closing the door, said mechanism involving a depressible portion of each cell's flooring, a trip rod carried by said depressible portion and projecting below the floor line and entering a recess formed in the door sill, said rod being provided with a notch adjacent to its outer free end; a trigger carried by the door adapted to engage in the notch portion of said trip rod when the door is open; and a tension spring member connected to said trigger which pulls the door shut when contact between said trigger and bar member is released.

In testimony whereof, I affix my signature in the presence of two witnesses.

NICOLA LIBERATO.

Witnesses:
GAETANO VENTURA,
LUIGI CIATTI.

Copies of this patent may be obtained for five cents each, by addressing the "Commissioner of Patents, Washington, D. C."